United States Patent
Knott et al.

(10) Patent No.: US 7,494,006 B2
(45) Date of Patent: Feb. 24, 2009

(54) MODULAR CONVEYOR BELTS AND ATTACHMENTS

(75) Inventors: Errol P. Knott, Gonzales, LA (US); R. Scott Dailey, Destrehan, LA (US); Richard M. Klein, Slidell, LA (US); Gilbert J. MacLachlan, Chalmette, LA (US)

(73) Assignee: Laitram, L.L.C., Harahan, LA (US)

( * ) Notice: Subject to any disclaimer, the term of this patent is extended or adjusted under 35 U.S.C. 154(b) by 102 days.

(21) Appl. No.: 11/160,049

(22) Filed: Jun. 7, 2005

(65) Prior Publication Data

US 2006/0272931 A1 Dec. 7, 2006

(51) Int. Cl.
*B65G 17/06* (2006.01)
*B65G 17/38* (2006.01)

(52) U.S. Cl. .................................... 198/850; 198/853

(58) Field of Classification Search ................. 198/850, 198/851, 852, 853, 860.1, 860.2, 699.1, 698
See application file for complete search history.

(56) References Cited

U.S. PATENT DOCUMENTS

| | | | | |
|---|---|---|---|---|
| 4,084,687 A * | 4/1978 | Lapeyre | ................... | 198/844.2 |
| 4,556,142 A | 12/1985 | Lapeyre | ...................... | 198/822 |
| 4,640,410 A | 2/1987 | Palmaer et al. | ......... | 198/803.01 |
| 4,832,183 A | 5/1989 | Lapeyre | | |
| 4,925,013 A | 5/1990 | Lapeyre | ...................... | 198/698 |
| 4,972,942 A | 11/1990 | Faulkner | ...................... | 198/853 |
| 5,165,514 A * | 11/1992 | Faulkner | ................... | 198/347.3 |
| 5,247,789 A | 9/1993 | Abbestam et al. | ............... | 59/78 |
| 5,280,833 A | 1/1994 | Robin | ........................ | 198/831 |
| 5,323,893 A | 6/1994 | Garbagnati | .............. | 198/690.2 |
| 5,361,893 A | 11/1994 | Lapeyre et al. | | |
| 5,469,956 A | 11/1995 | Greve et al. | .............. | 198/699.1 |
| 5,497,874 A * | 3/1996 | Layne | ........................ | 198/698 |
| 5,573,105 A | 11/1996 | Palmaer | ...................... | 198/853 |
| 5,738,205 A | 4/1998 | Draebel | ...................... | 198/852 |
| 6,073,756 A | 6/2000 | Damkjaer et al. | ........... | 198/853 |
| 6,216,854 B1 | 4/2001 | Damkjaer et al. | ........... | 198/853 |
| 6,318,544 B1 | 11/2001 | OConnor et al. | ............ | 198/853 |
| 6,332,531 B1 * | 12/2001 | Damkjaer | ................. | 198/690.2 |
| 6,364,095 B1 | 4/2002 | Layne et al. | ................. | 198/853 |
| 6,382,404 B1 * | 5/2002 | Guldenfels | .................. | 198/850 |
| 6,467,610 B1 | 10/2002 | MacLachlan | ............ | 198/699.1 |

(Continued)

OTHER PUBLICATIONS

European Patent Office, "International Search Report of PCT/US2006/021377," Oct. 10, 2006, European Patent Office as ISA, Rijswijk, the Netherlands.

*Primary Examiner*—Gene O. Crawford
*Assistant Examiner*—Ramya G Prakasam
(74) *Attorney, Agent, or Firm*—James T. Cronvich

(57) ABSTRACT

A modular conveyor belt and belt attachment members that are retained by hinge rods. The attachment members have a body with opposite outer and base surfaces. Interaction elements, such as high-friction surfaces, plates, or holddown wings, extend from the outer surface. The base surface mounts flush against a conveying surface or an opposite surface of the belt. Legs extend directly from the base surface into gaps between hinge elements extending longitudinally outward of conveyor belt modules forming the belt. Feet at distal ends of the legs hook under hinge rods to retain the attachment member firmly in place. The lateral spacings between the legs are related to the geometry of the hinge elements to register the attachment element with respect to the belt.

18 Claims, 4 Drawing Sheets

U.S. PATENT DOCUMENTS

| | | | |
|---|---|---|---|
| 6,554,129 B2 | 4/2003 | Straight et al. | 198/699.1 |
| 6,585,110 B2 | 7/2003 | Layne et al. | 198/852 |
| 6,837,367 B1 | 1/2005 | Klein et al. | 198/853 |

* cited by examiner

MODULAR CONVEYOR BELTS AND ATTACHMENTS

BACKGROUND

This invention relates generally to modular conveyor belts hingedly linked by hinge pins and, more particularly, to removable attachments to those conveyor belts.

Conveyor belts are widely used in many industries to transport articles. In the food and beverage industries, modular plastic belts, or chains, are often used because of their cleanability and their ability to operate with little lubrication. The modular belts are generally constructed of a plurality of belt modules arranged side by side to form a belt row. The modules include hinge elements at each end. The hinge elements of consecutive rows are interleaved and interconnected by hinge rods to construct a conveyor belt of any desired length and width.

Usually, these belts form generally flat article-conveying surfaces. But some applications require accessories that deviate from a flat article-conveying surface. Sideguards, flights, rollers, holddown tabs, guides, and various inserts are examples of accessories added to belts to perform various functions. Some accessories are detachable from the belt and others are integrally molded with or permanently bonded to the belt. Examples of integral accessories include integrally molded flights and bonded high-friction elastomeric layers. In some cases, integral accessories give the belt a complex geometry that requires an expensive mold that is difficult to operate properly; in others, co-molding different materials requires special processes and careful process control.

One shortcoming associated with integral accessories is that the belt modules including them must be made in a separate mold and represented by a separate part number from standard belt modules without accessories with which they are interconnected to form a conveyor belt. Another shortcoming is that, once an integral accessory is damaged, the entire module must be replaced.

To solve these problems, detachable accessories have been used. But these usually require attachment to a specially designed base module with a specially designed receptacle for the accessory or to a standard base module that has been specially machined or otherwise modified to receive the accessory. Or the accessory must be attached to a special-purpose retainer, such as fastener hardware that could come loose and contaminate the conveyed product.

To overcome these shortcomings, there is a need for a conveyor belt that accepts accessory attachments of various configurations, including complicated topographies, without necessarily requiring special receptacle modules, additional fastening hardware, or special belt modifications.

SUMMARY

This need and other needs are satisfied by a modular plastic conveyor belt and an attachment member embodying features of the invention. One version of such a conveyor belt comprises a series of rows of belt modules, in which each row has an intermediate portion that extends longitudinally from a first end to a second end and laterally from a first edge to a second edge. A first set of laterally spaced hinge elements extends longitudinally outward at the first end of the intermediate portion; a second set extends longitudinally outward at the second end of the intermediate portion. Gaps separate consecutive hinge elements of each set. The hinge elements of the first and second sets each have a first side toward the first edge of the row and an opposite second side toward the second edge and an aperture extending laterally from the first side to the second side. The series of rows are connected end to end with the first set of hinge elements of a row interleaved with the second set of hinge elements of an adjacent row so that the apertures of interleaved hinge elements are aligned to form a lateral passageway for receiving one of a plurality of hinge rods to connect adjacent rows together into a conveyor belt having a conveying surface and an opposite surface. An attachment member includes a body having an outer surface and a base surface, an interaction element connected to the outer surface, and a first leg and a second leg extending from the base surface. The legs each have a foot at a distal end. The attachment member is installed in the conveyor belt with the base surface contacting the conveying surface or the opposite surface. The first and second legs extend directly from the conveying surface or the outer surface into one or more of the gaps between hinge elements of the first set. The first and second legs are spaced apart so that the first leg contacts the first side of one of the hinge elements of the first set while the second leg contacts the second side of one of the hinge elements of the first set. The feet are retained by the hinge rod extending through the first set of hinge elements.

In another aspect of the invention, an attachment member for installation in a modular plastic conveyor belt comprises a body having an outer surface and a base surface. An interaction element is connected to the outer surface. Laterally spaced legs extend from the base surface. The lateral spacing between laterally consecutive legs alternates between a first wide spacing and a second narrow spacing.

In yet another aspect of the invention, an attachment member for installation in a modular plastic conveyor belt comprises a body having an outer surface and an opposite base surface, an elastomeric surface layer bonded to the outer surface, and a plurality of laterally spaced legs extending from the base surface for attaching to a conveyor belt.

DETAILED DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
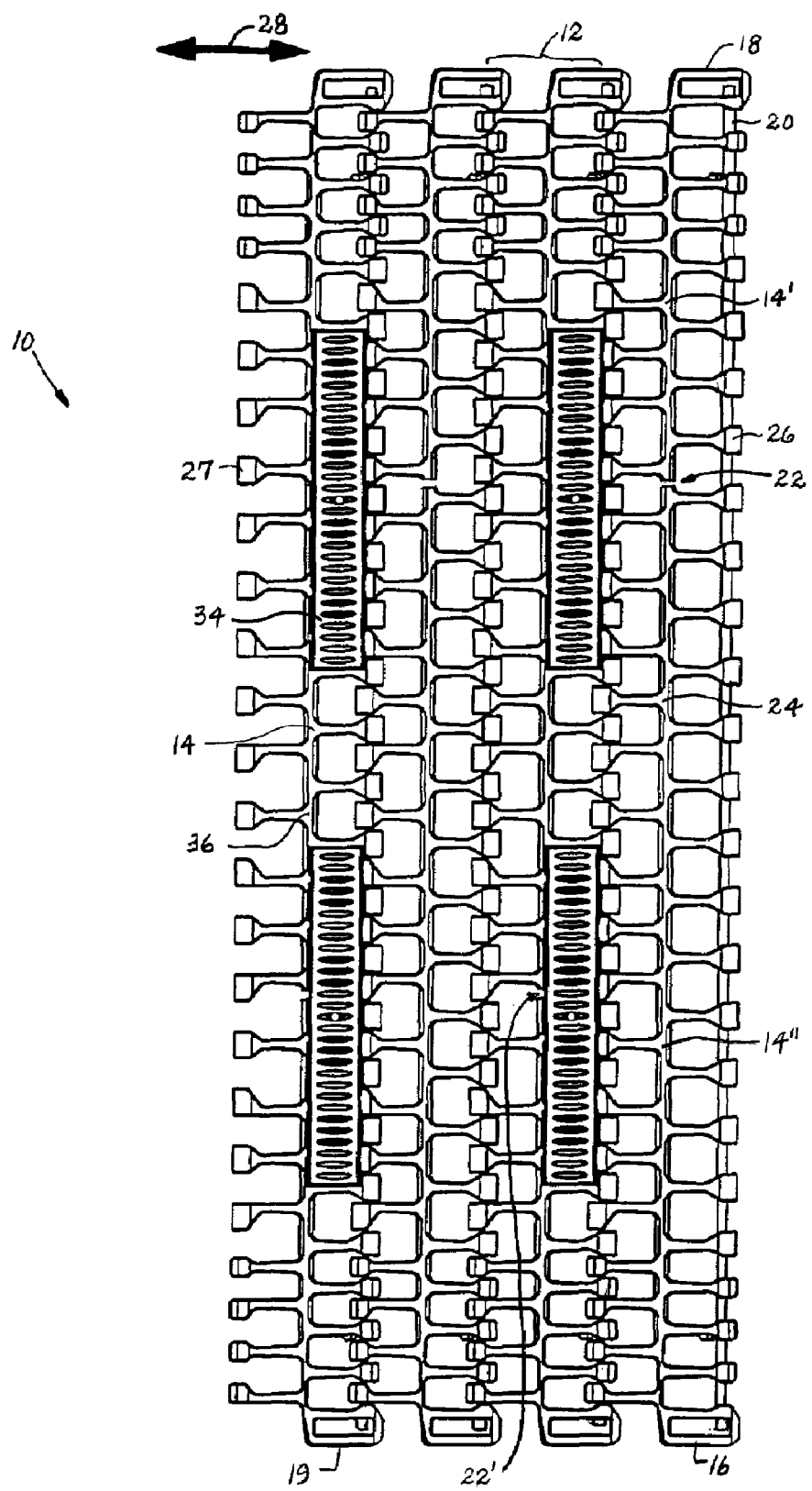
FIG. 1 is a top plan view of a portion of a modular plastic conveyor belt embodying features of the invention including a high-friction attachment member.

A portion of the conveyor belt embodying features of the invention is shown in FIG. 1. The belt 10 is constructed of a series of rows 12 of one or more belt modules 14, such as a short edge module 14' and a long edge module 14". The edge modules have edge structure 16 that gives the belt relatively flat-surfaced side edges 18, 19 and serves to restrain a hinge rod 20 from migrating past the belt edge. One or more internal modules similar in structure to the edge modules, but without edge structure may be positioned between the two edge modules in each row to construct a wider belt. For belts constructed of more than one module per row, the modules are preferably arranged in a bricklay pattern with laterally offset seams 22 from row to row for strength.

Figure 2:
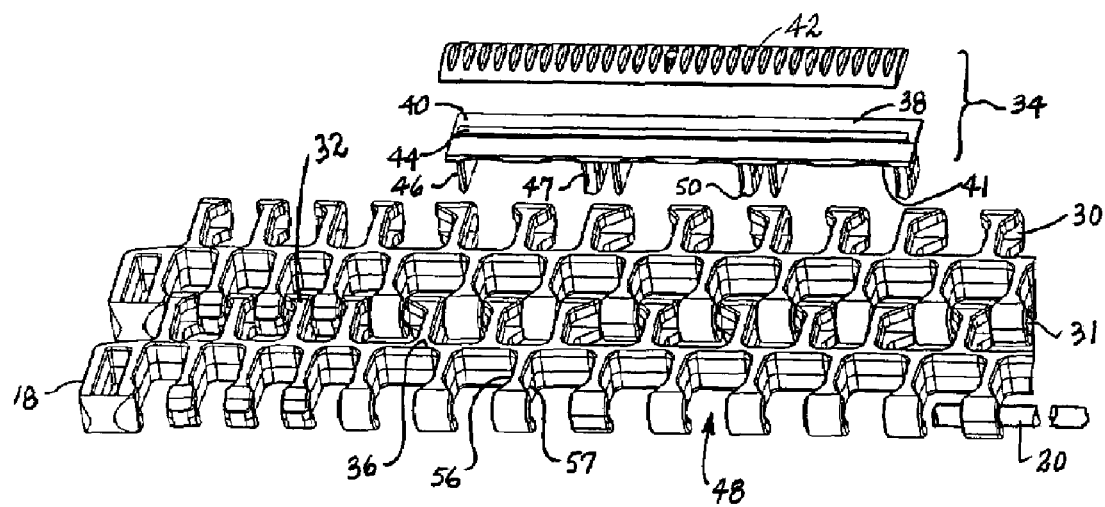
FIG. 2 is an exploded view of a portion of the belt of FIG. 1.

Each row includes an intermediate portion 24, in this case, a lateral strip. A first set of hinge elements 26 extends from the intermediate portion longitudinally in the direction of belt travel 28. A second set 27 extends longitudinally in the opposite direction. The first and second sets of hinge elements define first and second ends of the rows. As shown in FIG. 2, apertures 30, 31 through the first and second sets of hinge elements receive the hinge rod 20. The apertures 30 along the first end are preferably circular with a diameter just greater than that of the hinge rod. The apertures 31 through the second set of hinge elements are longitudinally elongated to allow the belt to negotiate turns. But both sets of apertures could be circular for a straight-running belt or shaped otherwise for other hinge rod cross sections or special purposes. The first set of hinge elements of a row are interleaved with the second set of hinge elements of an adjacent row. The aligned apertures of the interleaved hinge elements form a lateral passageway for the hinge rod, which connects adjacent rows together at a hinge joint 32. The belt is able to articulate at its joints about sprockets or drums that drive the belt.

A high-friction attachment member 34 is shown in FIG. 1 attached at a conveying surface 36, of the belt. As shown in FIG. 2, the attachment member includes a body 38 having an outer surface 40 and a base surface 41. An interaction element in the form of a high-friction element 42 is attached, preferably by bonding, to the outer surface of the attachment body. (An interaction element means an element that interacts with an external object not part of the belt. A conveyed article and conveyor frame structure are examples of external objects.) A T-shaped beam 44 upstanding from the outer surface provides the wide attachment member with beam strength to prevent the attachment member from warping under molded-in stresses and also adds more surface area to improve the attachment of the high-friction element to the attachment body.

Figure 3:
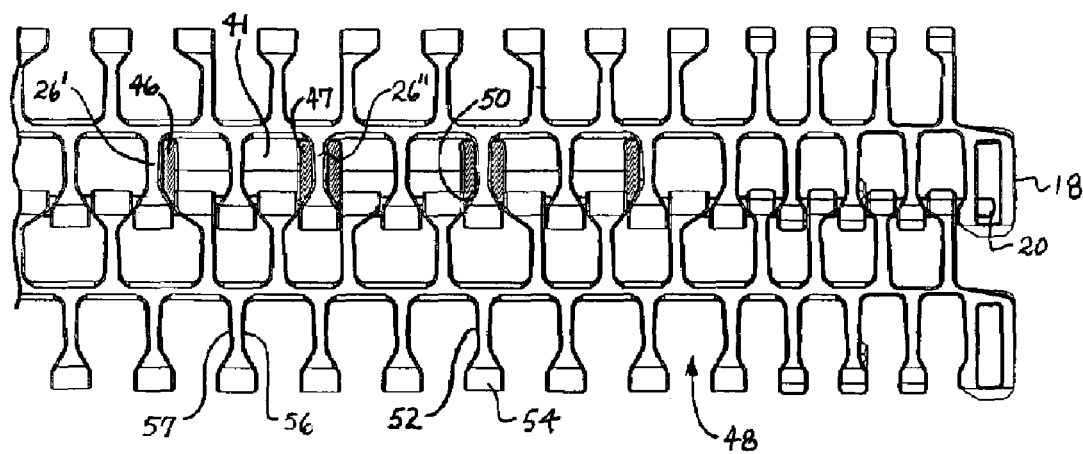
FIG. 3 is a bottom plan view of a portion of the belt of FIG. 1.

First legs 46 and second legs 47 extend from the base surface 41 of the attachment element. Each leg is much narrower than the lateral dimension of gaps 48 formed between consecutive hinge elements that accommodate interleaved hinge elements of an adjacent row. As shown in FIG. 3, the narrow legs leave enough space in the gap to accommodate the interleaved hinge elements. At the distal end of each leg is a foot 50 that extends from the leg. The foot is a slight projection that hooks under a hinge rod in the lateral passageway. A narrow neck 52 of each hinge element extends longitudinally from the intermediate portion of each belt module to a wide distal head 54. Each hinge element extends in thickness from a first side 56 nearer the first edge 18 of the belt to a second side 57 nearer the opposite second edge. The first leg 46 is separated laterally from the second leg 47 so that, when the attachment member is installed in the belt, the first leg contacts the first side of a hinge element, e.g., hinge element 26' in FIG. 3, and the second leg contacts the second side of a hinge element, e.g., hinge element 26". This spacing registers the attachment member in position with its base surface 41 supported a top the conveying surface of the belt. The hinge rod hooked under the feet of the legs resides between the feet and the base surface of the attachment member.

The attachment member shown in FIGS. 2 and 3 has three pairs of legs. The lateral spacing between adjacent legs alternates between wide spacings and narrow spacings. In this example, the narrow spacing corresponds to the lateral thickness of the neck of a hinge element. It can also be seen that the legs' longitudinal extent generally matches the longitudinal extent of the neck of the hinge elements. The wide attachment element can span a seam, such as seam 22' in FIG. 1, and thereby provide additional beam strength to the row.

The belt is preferably a modular plastic conveyor belt constructed of modules made of a thermoplastic polymer such as polypropylene, polyethylene, acetal, or a composite polymer in an injection-molding process. The hinge rod may be stainless steel, but is preferably a thermoplastic rod molded or extruded. The attachment member body may likewise be molded out of a thermoplastic polymer. Belts and hinge rods of this kind are manufactured and sold by Intralox, L.L.C., of Harahan, La., USA. The high-friction material may be a rubber or elastomer that is bonded to the outer surface of the attachment body by co-molding, welding, adhesives, or mechanical connection.

Figure 4:
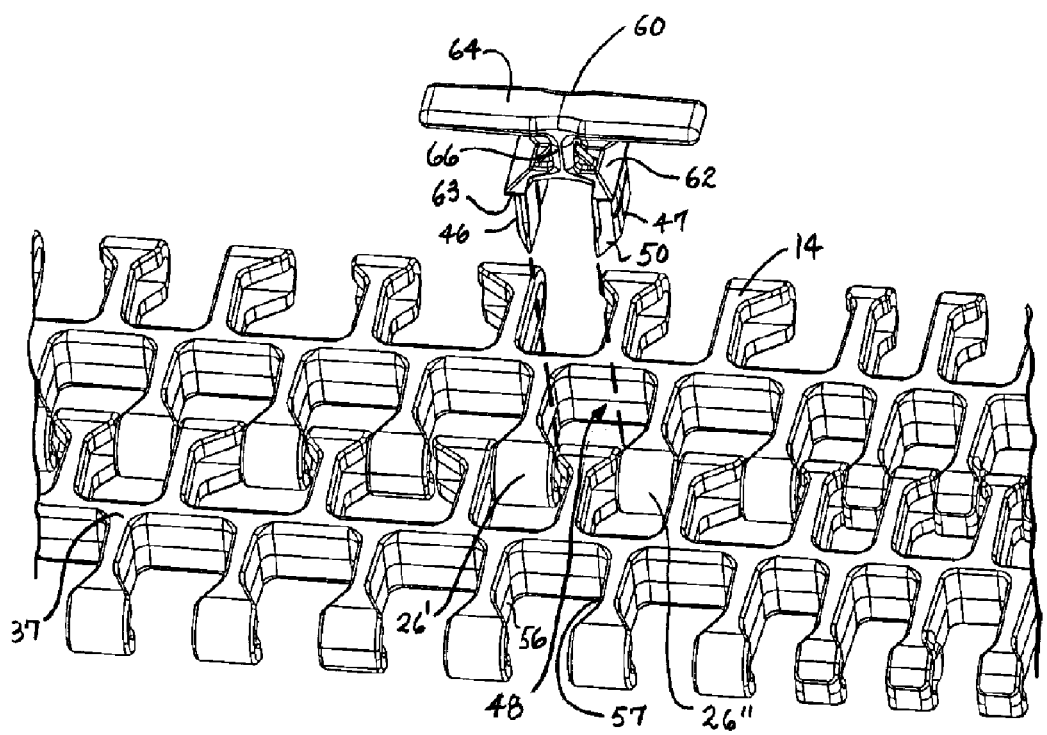
FIG. 4 is an exploded view of a portion of a belt as in FIG. 1 with another version of attachment member for holding the belt down in turns.
Figure 5:
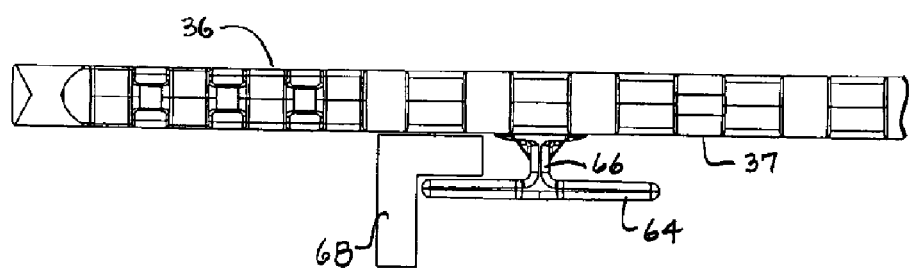
FIG. 5 is a front elevation view of a portion of the belt of FIG. 4.

Another version of attachment member is shown in FIGS. 4 and 5 connected into a similar belt. The attachment member 60 includes a body having an outer surface 62 and an opposite base surface 63. An interaction element in the form of holddown wing 64 with a lateral wingspan extends from the base surface via a central post 66. First and second legs 46, 47 extend from the base surface. Each leg has a foot 50 protruding at its distal end. The holddown attachment member 60 is inserted into a single gap 48 between adjacent hinge elements. The first leg 46 contacts the first side of the hinge element 26', and the second leg 47 contacts the second side 57 of hinge element 26" to register the holddown member in place. A hinge rod inserted in the lateral passageway through the interleaved hinge elements retains the attachment member in place. The base surface of the attachment member is flush with the opposite surface 37 of the belt from the conveying surface 36. In operation, the wing 64 hooks under a horizontal ledge of a conveyor guide 68 to hold the belt down in turns. The wing shown in the figures is two-sided, but a one-sided wing is also possible.

Figure 6:
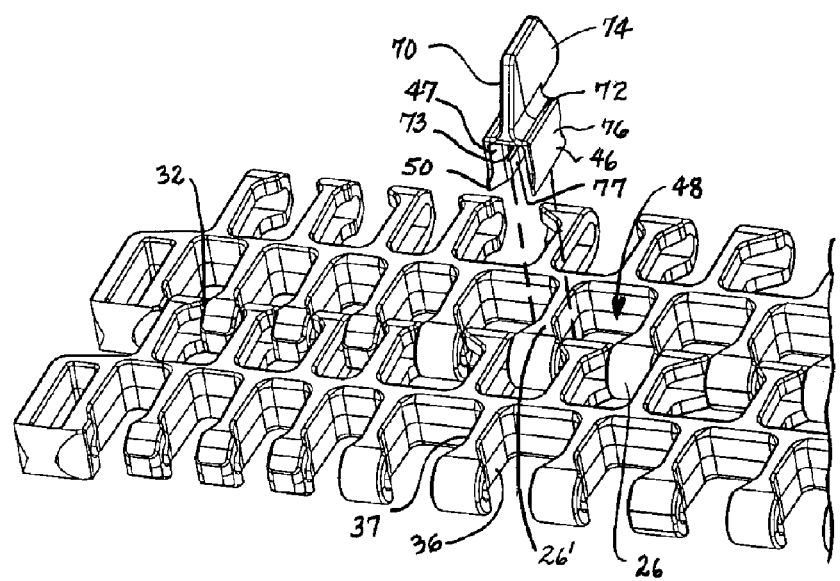
FIG. 6 is an exploded view of a portion of a belt as in FIG. 1 with yet another version of attachment member for forming lanes on the belt's conveying surface.
Figure 7:
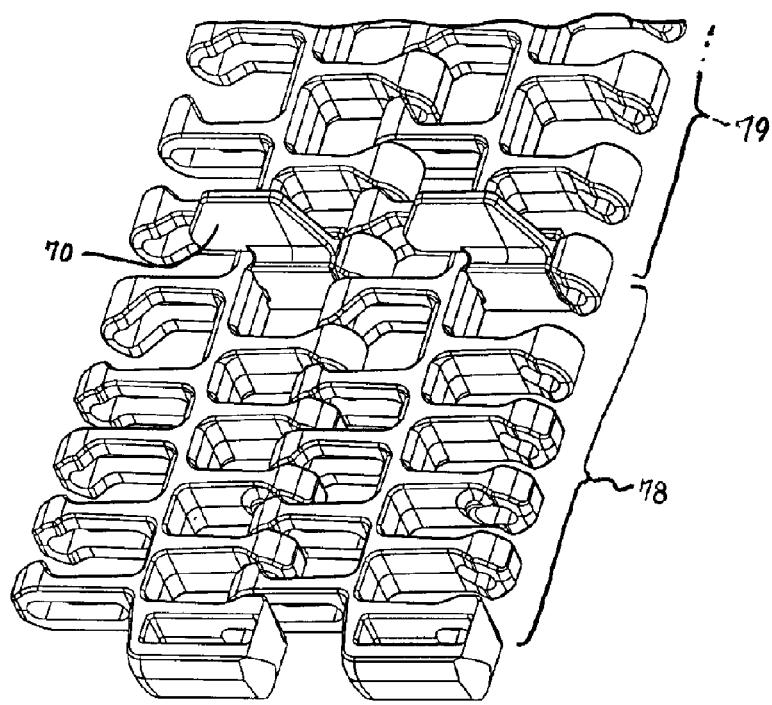
FIG. 7 is another view of the conveying surface of a belt as in FIG. 6.

Yet another version of an attachment member is shown in FIGS. 6 and 7. In this version the attachment member 70 is a lane divider. The attachment member has a body with an outer surface 72 and an opposite base surface 73. An interactive element in the form of an upstanding plate 74 extends from the outer surface of the body. First and second legs 46, 47 extend from the base surface. Feet 50 project outward from the legs. The legs slip directly into the gaps 48 between adjacent hinge elements with the base surface supported on the conveying surface 36 of the belt. In this version, the first and second legs fit into adjacent gaps separated by a hinge element 26'. The first leg 46 contacts the first side 36 of the hinge element, and the second leg 47 contacts the second side of the same hinge element. A hinge rod inserted into the lateral passageway at the hinge joint 32 between the base surface and the feet 50 straddling the hinge element retains the attachment member firmly in position. Like the legs of the other attachment members, these legs have a flat wall 76 that does not contact the hinge element and an opposite contoured wall 77 that matches the shape of and contacts the side of the hinge element. As shown in FIG. 7, a series of sideguards or lane dividers 70 along the length of the belt can divide the belt into longitudinal lanes, such as an edge lane 78 at each edge and one or more interior lanes 79. The edge lanes can serve as product-free belt regions, while multiple interior lanes can separate product laterally into individual flows.

Although the invention has been described with respect to a few preferred versions, other versions are possible. For example, the attachment member could include an interaction element consisting of a lateral plate to form a flight. As another example, a variety of surfaces could be attached to a bas surface as on the body of FIG. 2. Rollers and other elements could be attached in an assembly to a belt using the attachment scheme shown. So, as these few examples suggest, the scope of the claims is not meant to be limited to the preferred exemplary versions described.

What is claimed is:

1. A modular conveyor belt comprising:
    a series of rows of belt modules, wherein each row comprises:
        an intermediate portion extending longitudinally from a first end to a second end and laterally from a first edge to a second edge;
        a first set of hinge elements spaced apart laterally and extending longitudinally outward at the first end of the intermediate portion to form gaps between laterally consecutive hinge elements;
        a second set of hinge elements spaced apart laterally and extending longitudinally outward at the second end of the intermediate portion to form gaps between laterally consecutive hinge elements;
        wherein the hinge elements of the first and second sets each have a first side toward the first edge of the row and an opposite second side toward the second edge and an aperture extending laterally from the first side to the second side;
    a plurality of hinge rods;
    wherein the series of rows are connected end to end with the first set of hinge elements of a row interleaved with the second set of hinge elements of an adjacent row so that the apertures of interleaved hinge elements are aligned to form a lateral passageway for receiving a hinge rod to connect adjacent rows together into a conveyor belt having a conveying surface and an opposite surface;
    an attachment member including:
        a body having an outer surface and a base surface;
        an interaction element connected to the outer surface;
        a first leg and a second leg extending from the base surface, the first leg and the second leg each having a foot at a distal end;
    wherein the attachment member is installed in a preselected row of the conveyor belt with the base surface contacting one of the conveying surface and the opposite surface and the first and second legs extend directly from the conveying surface or the opposite surface into one or more of the gaps formed between laterally consecutive hinge elements of the first set in the preselected row; and
    wherein the first and second legs are spaced apart so that the first leg contacts the first side of one of the hinge elements of the first set in the preselected row while the second leg contacts the second side of one of the hinge elements of the first set in the preselected row; and
    wherein the feet are retained by the hinge rod extending through the first set of hinge elements in the preselected row.

2. A modular conveyor belt as in claim 1 wherein the first leg contacts the first side of a hinge element and the second leg contacts the second side of the hinge element.

3. A modular conveyor belt as in claim 1 wherein the first leg contacts the first side of a hinge element and the second leg contacts the second side of another hinge element.

4. A modular conveyor belt as in claim 1 wherein the first and second legs extend into the same gap between consecutive hinge elements.

5. A modular conveyor belt as in claim 1 wherein the attachment member includes a plurality of pairs of first and second legs.

6. A modular conveyor belt as in claim 1 wherein the hinge rod is disposed between the feet of the installed attachment member and the base surface of the attachment member.

7. A modular conveyor belt as in claim 1 wherein the hinge elements include a narrow neck extending longitudinally from the intermediate portion to a wider distal head and wherein the first and second legs generally match the neck in longitudinal extent.

8. A modular conveyor belt as in claim 1 wherein the interaction element is selected from the group consisting of a holddown wing, a lane divider, a flight, and a high-friction element.

9. A modular conveyor belt as in claim 1 wherein the interaction element comprises a wing having a lateral wingspan and a post connecting the wing to the outer surface of the attachment member.

10. A modular conveyor belt as in claim 1 wherein the interaction element comprises a high-friction elastomeric surface attached to the outer surface of the attachment member.

11. A modular conveyor belt as in claim 1 wherein the attachment member further includes a beam extending laterally along the outer surface of the attachment member.

12. A modular conveyor belt as in claim 11 wherein the beam is T-shaped in cross section and wherein the interaction element comprises a high-friction elastomeric surface attached to the outer surface and the T-shaped beam of the attachment member.

13. A modular conveyor belt as in claim 1 wherein the interaction element comprises a plate extending outward from the base surface of the attachment member.

14. An attachment member for installation in a modular plastic conveyor belt, the attachment member comprising:
    a body having an outer surface and a base surface;
    an interaction element connected to the outer surface;
    a plurality of laterally spaced pairs of legs extending from the base surface, wherein each pair includes a first leg and a consecutive second leg separated by a first space and wherein the interior legs of two consecutive pairs of legs are separated by a second space narrower than the first space.

15. An attachment member as in claim 14 wherein each of the legs includes a foot extending outward from a distal end of the leg.

16. An attachment member as in claim 14 wherein the interaction element comprises a wing having a lateral wingspan and a post connecting the wing to the outer surface of the attachment member.

17. An attachment member as in claim 14 wherein the interaction element comprises a high-friction elastomeric surface attached to the outer surface of the attachment member.

18. An attachment member as in claim 14 wherein the attachment member further includes a beam extending laterally along the outer surface of the attachment member.

* * * * *